May 26, 1959 R. S. LACKEY ET AL 2,887,885
TEMPERATURE COMPENSATED DAMPED RATE GYRO
Filed April 6, 1955 3 Sheets-Sheet 1

Fig. I.

WITNESSES
Robert C. Baird
John B. Davidson

INVENTORS
Robert S. Lackey &
John E. Houtz.
BY
Paul E. Friedemann
ATTORNEY

May 26, 1959   R. S. LACKEY ET AL   2,887,885
TEMPERATURE COMPENSATED DAMPED RATE GYRO
Filed April 6, 1955   3 Sheets-Sheet 2

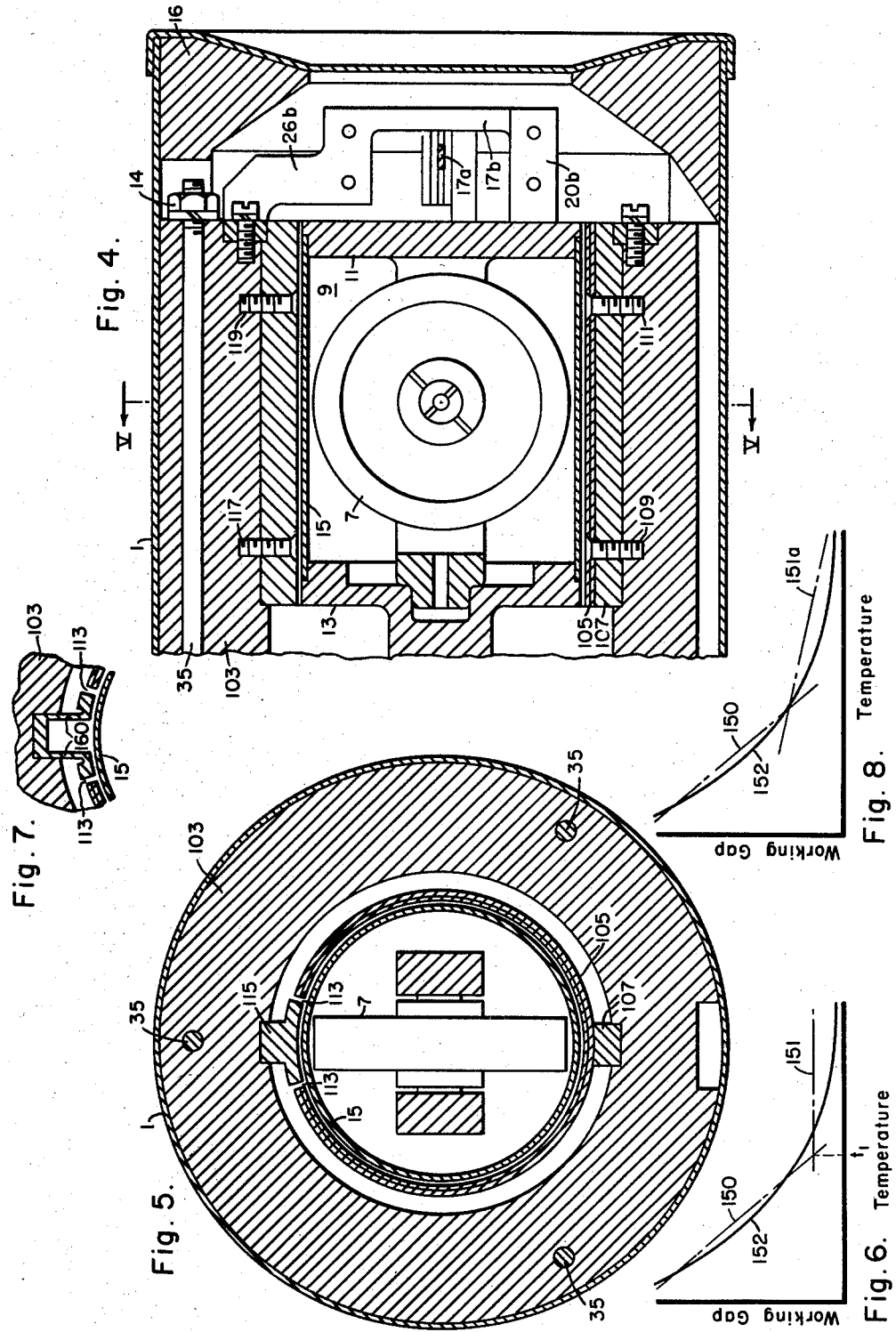

United States Patent Office 2,887,885
Patented May 26, 1959

2,887,885

TEMPERATURE COMPENSATED DAMPED RATE GYRO

Robert S. Lackey, Catonsville, and John E. Houtz, Baltimore, Md., assignors to Westinghouse Electric Corporation, East Pittsburgh, Pa., a corporation of Pennsylvania Application April 6, 1955, Serial No. 499,598

13 Claims. (Cl. 74—5.5)

Our invention relates generally to measuring and indicating devices and more particularly to angular rate gyroscopes adapted to indicate the rate of angular motion of a craft on which the gyroscope is mounted.

In U.S. Patent 2,687,648, granted to Henry Konet on August 31, 1954, there is described a type of angular rate gyroscope wherein the gyroscope rotor is mounted in a casing suspended by pairs of opposing planar springs for oscillation in a frame. The springs yieldingly oppose precession of the casing in either direction from a neutral position; each of the planar springs is secured at one end to the rotor casing and at the other end to the frame, the springs being free of engagement with each other, and also free of engagement with the rotor support at their points of crossing. The preferable characteristics of a satisfactory rate gyroscope of the type disclosed in the Konet patent are that the natural frequency of the rotor and its suspension system be high relative to the frequency of the rates of change to be measured, that the spring suspension deflection be proportional to the precession torque of the gyroscope, that the suspension have little or no friction, and that sufficient damping exist to damp oscillations of the rotor casing relative to the frame. It has been found that it is quite difficult to obtain sufficient deflection of the rotor casing for practical purposes when the springs are sufficiently rigid to thus support the rotor casing and thus extremely sensitive pickoffs are required; if satisfactory deflection is to be obtained, the springs will be much too weak to support the casing. Electrical amplifiers may be used to increase the sensitivity of the pickoff but such amplifiers generally produce intolerable errors and are actually a rather crude expedient for circumventing the shortcomings of the gyroscope since any drift in the characteristics of such amplifiers will obviously appear as changes in the gyro output.

Additionally, to damp oscillations of the gyroscope such as may be produced by shocks or sudden, violent changes in attitude of the craft on which the gyroscope is mounted, the gyroscope described in the aforementioned Patent 2,687,648 utilizes a vane supported by the rotor casing adapted for lateral movement between the pole faces of a permanent magnet. Satisfactory damping has been found to be very difficult with this particular arrangement when the component parts are to be kept small and of light weight such as required in aircraft installations.

It has been known in the past to use viscous damping means for devices such as position gyroscopes; an example of the prior art of this type may be found in U.S. Patent 2,395,940, granted to J. G. Ritter on March 5, 1946. Therein is described a position gyroscope utilizing a fluid volume confined within a pair of fluid-filled bellows to damp a gyroscope rotor casing coupled to one of the bellows, the gyro casing expanding and contracting the bellows in accordance with its angular position. A bimetal bar is used to compensate for changes in the volume of the liquid which may be brought about by ambient temperature variations. This arrangement has been found to be not particularly practical for devices such as angular rate gyroscopes for at least two reasons. First, an angular rate gyroscope must respond very rapidly to changes in the signal force applied to its input axis; the use of bellows damping as described above would result in a device which, while satisfactory for position gyroscopes, would be entirely too sluggish in operation for an angular rate gyroscope. The use of bellows also causes a hysteresis effect which, although possibly masked by the dead space in the pickoff device, would be noticeable and undesirable. Second, a spring loaded angular rate gyroscope having a contact damping characteristic has a given position vs. time interval characteristic for each input velocity signal imposed thereon. Therefore, for a constant time interval at which the input signal is applied, there will be a given gyroscope deflection for a given input velocity signal. Should the damping characteristic vary with change in the ambient temperature, the deflection producing the given input velocity will be found to vary considerably, and it will be necessary to recalibrate the device for each ambient temperature encountered, an obviously intolerable expedient. Due to the relatively enormous deflections which would be required of the temperature responsive bimetallic bar, the device described in the Ritter patent is incapable of maintaining a reasonably constant damping characteristic with variations in ambient temperature.

Accordingly, one object of our invention is to provide a measuring and indicating device utilizing a rotatable member, the angular rotation of which is indicative of the quantity to be measured wherein oscillations that may detrimentally effect the accuracy of the device are effectively damped.

Another object is to provide such a measuring device including viscous means for damping oscillations of the rotatable indicating member wherein provision is made for rendering the damping effectiveness substantially independent of variations in the ambient temperature and the temperature of the device.

Still another object is to provide an improved damping arrangement for an angular rate gyroscope utilizing a crossed spring rotor position restoring arrangement.

In accordance with one aspect of our invention, we provide a rotatable housing having a generally right circular cylindrical outer surface such as the housing for an angular rate gyroscope rotor. The housing is disposed in a temperature responsive member having a generally right circular cylindrical inner surface of slightly greater radius than that of the outer surface of the rotor housing. A small gap is thus formed between the housing and the temperature responsive member. The entire assembly is disposed in a fluid-tight frame; when an angular rate gyroscope is contemplated, sets of opposing crossed planar springs at either or both ends of the housing are utilized for yieldingly opposing precession of the housing about an axis at an angle to the gyro spin axis such as is taught in the aforementioned Patent 2,687,648. Each of the springs is secured at one end to the frame and at the other end to the rotor support, the springs being free of the rotor housing at the point at which the springs cross each other. A dielectric fluid medium, such as one of the silicone fluids, pervades the interior of the frame including the gap between the housing and the temperature responsive member. The expansion of the temperature responsive member with variations in temperature, and thus the extent to which the gap decreases with temperature is related to the relationship between change of fluid viscosity with change in temperature such that the coefficient of damping remains relatively constant. Oscillations that could build up as a result of shocks and vibrations are effectively damped by the frictional resistance of the fluid medium in which the housing is suspended, and this frictional resistance remains relatively constant over the operating temperature range of the instrument.

Other objects and features of our invention will become apparent upon consideration of the following detailed description thereof when taken in connection with the accompanying drawings wherein:

Fig. 4 is a partial cross-sectional side view illustrating a second embodiment of our invention;

Fig. 5 is a cross-sectional view of the embodiment of Fig. 4 taken along line V—V;

Fig. 6 is a curve of working gap between two temperature responsive elements in our invention as a function of temperature, as compared to the ideal radius-temperature relationship, which curves are useful in understanding the operation of our invention;

Fig. 7 is a partial cross sectional view including a portion of Fig. 5, which illustrates still another embodiment of our invention; and Fig. 8 is a curve similar to Fig. 6 to illustrate the advantages of the embodiment of Fig. 7.

Figure 1:
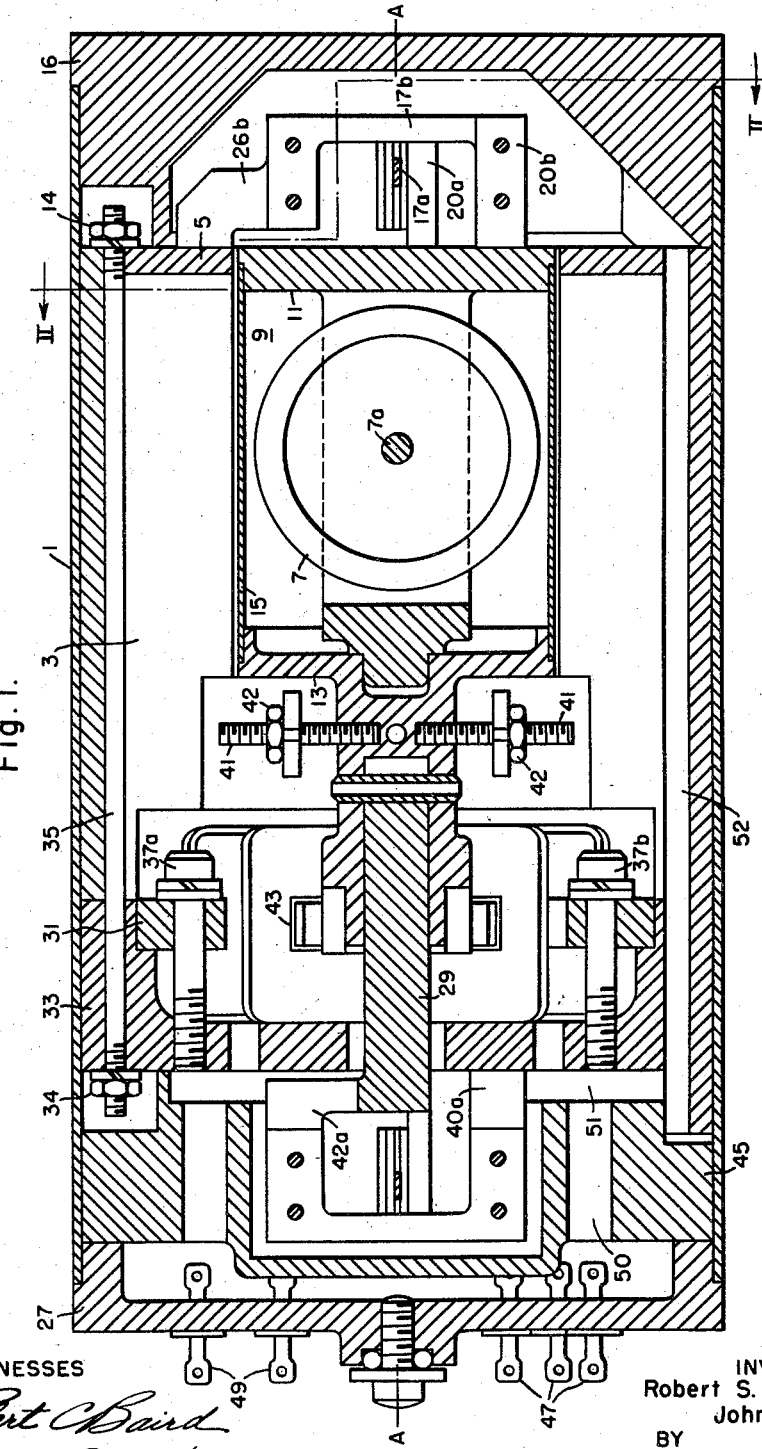
Figure 1 is a cross-sectional top view of one embodiment of our invention.
Figure 2:
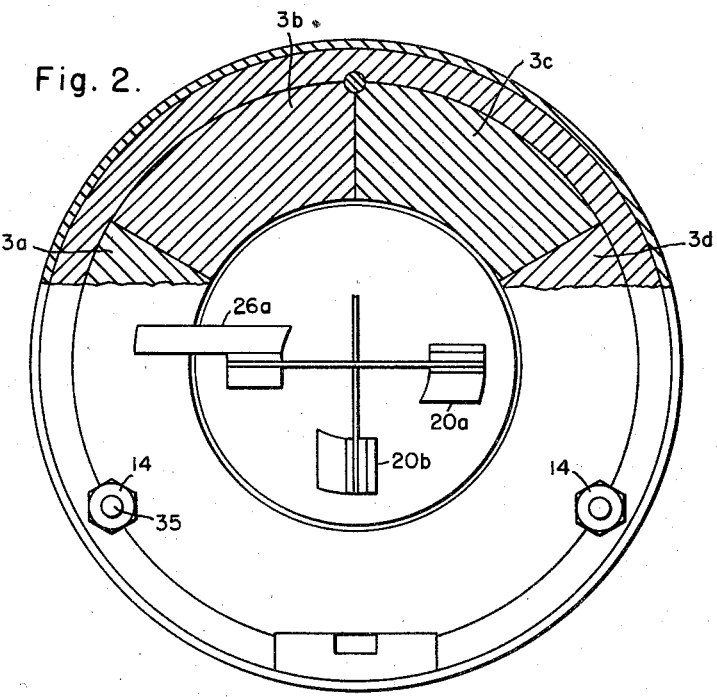
Fig. 2 is a right end view of the embodiment of Fig. 1, partially in cross section along the line II—II assuming the right end plate 16 removed.
Figure 3:
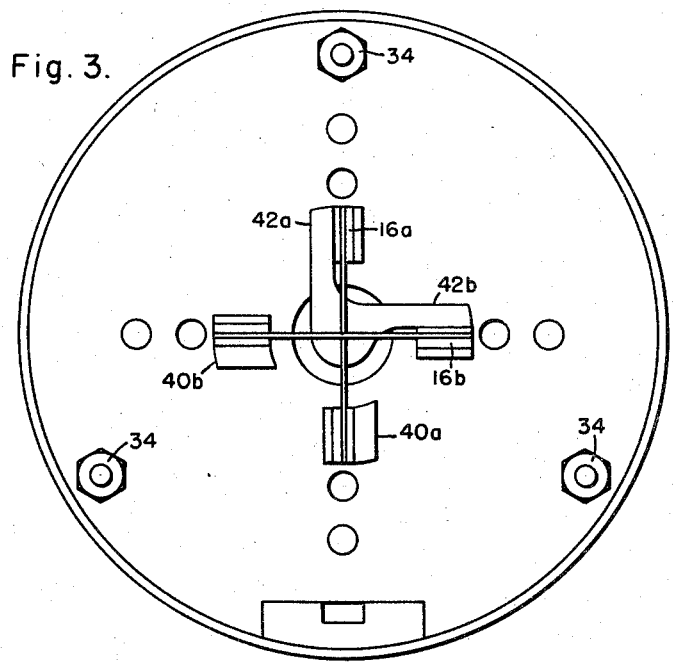
Fig. 3 is a left end view of the embodiment of Fig. 1 with end plate 27 and spacer member 45 removed.

With reference now to the embodiment of our invention illustrated in Figs. 1, 2 and 3, there is shown an angular rate gyroscope having a gyro wheel 7 suspended within a casing or gimbal structure. The gyroscope frame includes a ring housing 1 having a cylindrical bore and a composite insert including a plurality of similarly shaped members 3 secured to the ring housing by means of bolts 35 which extends through microsyn stator housing 33 and spacer plate 5. The composite insert has a cylindrical bore having an axis A—A and may be formed of a thermosetting composition such as described in United States Patent No. 2,396,098 to Joseph L. Haas, which material is resistant to the chemical action of the damping fluid and which has a high positive temperature responsive characteristic; i.e., the volume of the material increases as the temperature thereof increases. A thermosetting composition that has been found particularly satisfactory for use as the composite insert was made in accordance with the teachings of the aforementioned Haas patent according to the following table:

| | Parts by weight |
|---|---|
| Polyvinyl butyral (Monsanto B72A) | 100 |
| Triethylene glycol di-2-ethylhexoate plasticizer | 17 |
| Zinc oxide | 1 |
| Stearic oxide | 1 |
| Phenol formaldehyde (or other thermosetting resin) | 1 |

The gimbal structure 9 consists of a gimbal 11, an end cap 13 and a right circular cylindrical sheet 15 whose combination forms a rigid, liquid tight container around the gyro wheel 7. The surface of gimbal 11 perpendicular to axis A—A and external to the liquid tight combination carries lugs 20a and 20b. The end cap 13 contains four orthogonally spaced screw threaded studs 41 screwed onto each of which is a balancing nut 42 for the purpose of adjusting the center of gravity of the moving element of the gyroscope to axis A—A. The axis of each of the studs 41 is perpendicular to the axis A—A of the cylindrical bores and cylindrical sheet 15. A spider 29 is provided which consists of a shaft coupled to end plate 13 and carrying coplanar arms 42a and 42b, respectively carrying lugs 16a and 16b. The spider shaft is fastened to the end cap 13 along the axis A—A. The combination of spider 29, microsyn rotor 43 affixed to the spider, gimbal 9, cylindrical sheet 15 and the spin motor (not shown) form the moving element of the gyroscope.

The end of the housing 1 adjacent to the gimbal contains two equiangularly spaced lugs, one of which is designated 26a in Fig. 2, which project toward the axis A—A. A microsyn stator housing 33 is secured to the opposite end of the ring housing as previously mentioned. Two equiangularly spaced lugs 20a and 20b are affixed to the gimbal 11 on the side thereof opposite the gyro rotor at equal distances from the axis A—A. Flat planar springs 17a and 17b, which may be formed of strips of beryllium copper, are respectively secured between the lug pairs 26a, 20a and 26b—20b in a manner such that the centroidal planes of each spring intersect along the axis A—A. As mentioned, the strips 17a and 17b are quite flexible but they must be stiff enough to exert a force on the gimbal structure sufficient to bring it to a predetermined position relative to the frame with no other forces imposed upon the gimbal structure.

A microsyn stator housing 33 is centrally positioned onto the opposite end of the ring housing 1 by bolts 35 and nuts 14, 34 as previously mentioned. This housing supports the microsyn stator 31 by means of four fastening screws, two of which are denoted 37a, 37b. The external surface of the stator housing perpendicular to the axis A—A supports two equiangularly spaced lugs 40a and 40b which are located at a radial distance from the axis preferably equal to that of the lugs 20, 26. Likewise, lugs 42a, 42b are connected to the moving element of the gyro; flat planar springs are connected between lugs 40a, 42a and 40b—42b.

Electrical connections to the spin motor driving the gyro are made through connections designed to exert little or no torque on the moving element, such as miniaturized slip rings. The design of these connections is well known to the art and they are not shown in the drawings. The electrical connections are connected through hermetically sealed terminals in the gimbal which, in turn, are connected to the spin motor leads. Electrical terminals 47 in end bell 27 are connected to the slip rings by wires extending through channels 50, 51 and 52.

Electrical connections 49 in end bell 27 are connected to the microsyn stator 31. The microsyn rotor and stator form an electrical pickoff device such that the phase and magnitude of the voltage appearing across terminals 49 derived from stator 31 is indicative of the direction and magnitude, respectively, of the angular position of the moving element of the gyroscope from a given reference position, such as described in the aforementioned Patent No. 2,687,648.

The interior of the outer casing between the movable gyro member and the parts exterior thereto is filled with a viscous fluid such as one of the silicone fluids, the chemical composition of which is represented by the following formula:

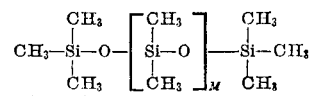

where "M" is a whole number. The function of this fluid is to damp oscillations of the moving element of the gyroscope and also to provide a lubricating film between the right circular cylindrical sheet 15 and the inner surface of the composite insert 3.

The coefficient of damping for the device described above is given by the following equation:

$$(1) \qquad C_d = \mu \frac{2\pi R^3 L}{h}$$

where "$\mu$" is the viscosity of the silicone fluid in dyne-seconds/cm.$^2$, R is the outer radius of sheet 15 in centimeters, L is the length in centimeters of the right circular cylindrical surface including gimbal 11, sheet 15 and end cap 13, h is the working gap in centimeters between the outer surface of sheet 15 and the inner surface of composite insert 3 and $C_d$ is the coefficient of damping in dyne-centimeter seconds.

Inasmuch as the viscosity of the fluid is sensitive to temperature changes much more than the composite parts of the gyroscope with the exception of composite insert 3, it will be assumed that any change in damping coefficient is due solely to changes in viscosity and to changes in the radial dimension of composite insert 3. For a silicone fluid the change in viscosity with temperature can be approximated closely by a function of the type:

(2) $$\mu = Ae^{-KT}$$

where A is a constant, $e$ is the Naperian logarithmic base, K is a constant ($-0.15$ for silicone fluid) and T is temperature in degrees Fahrenheit. Inasmuch as it is desired to keep the coefficient of damping constant, it can be seen from the above formulae that this can be accomplished if the working gap "$h$" can be made to vary exponentially with temperature. It has been found that with a composite insert formed of a thermosensitive material such as previously described, the change of gap with temperature can hold the coefficient of damping reasonably constant over a temperature range from at least 60° F. to 150° F. The change of gap $h$ with temperature is linear. However, over the temperature range noted above, the ideal temperature gap can be represented by the equation:

$$h = \frac{2R^3L}{C_d}Ae^{-KT}$$

In the temperature range noted above the variation of working gap with temperature can be approximated by a straight line so that the damping coefficient remains constant within a variational range of 10% over the above-noted temperature range. From the above description of our invention, it will be noted that the function of the planar springs is primarily to return the moving element to a given angular position relative to the frame of the gyroscope and it is required to support only a minimum amount of weight, this function being achieved primarily by the flotation of the gyro casing in its bath of damping fluid. Further, the damping fluid tends to cushion any relative motions between casing and frame such as may be produced by vibration or shock.

In Figs. 4 and 5 there is shown another embodiment of our invention having a considerably greater temperature range than is possible with the embodiment of Fig. 1. Therein is shown a casing 1 supporting a solid, relatively non-temperature-sensitive liner 103. Only a portion of the moving element of the gyro is shown in this embodiment, identical reference numerals referring to the same components as described above with reference to Figs. 1 and 2. A bimetal right cylindrical sheet 105 is secured to support member 103 by means of a key 107 and a pair of small bolts 109 and 111. The bimetal sheet has a longitudinal slot 113 cut therethrough diametrically opposite to the key 107. A stop key 115 is affixed to support member 103 by bolts 117, 119 so as to extend into the longitudinal slot in the bimetal ring 105. The function of this stop key is to prevent the edges of the bimetal ring from coming together closer than a predetermined distance determined by the dimensions of the stop key as the ring expands with increasing temperature. As will be evident, the working gap between the bimetal ring and the outer surface of the right cylindrical sheet 15 will decrease as the temperature of the bimetal ring increases. The relationship between working gap and temperature will be essentially a linear one until the edges of the ring contact the stop key, at which point there will be a discontinuity in the working gap-temperature relationship, the working gap remaining essentially constant with further increase in temperature. This relationship is shown in Fig. 6 where the portion of the curve 150 denotes the working gap before the edges of the ring contact the stop key at temperature $t_1$, and curve 151 denotes the relationship between the working gap and temperature thereafter. The ideal working gap-temperature relationship that will provide a constant coefficient of damping is depicted by curve 152. It can be seen that the temperature range over which the actual radius will approach the ideal radius if a constant damping coefficient is to be achieved is extended over a considerably greater temperature range than with the vinyl butyral acetate composite liner described above; it has been found possible to maintain the coefficient of damping constant to within ±15% for temperature variation from −40° F. to 140° F.

In the embodiment shown in Fig. 7, a U-shaped spring stop 160 is substituted for the solid stop of Fig. 6. It has been found that an even closer approximation to the ideal relationship between working gap and temperature is thereby achieved, the spring stop exerting a progressively increasing resistance to the compressive force of the edges of the bimetal strip. This relationship is shown more clearly in Fig. 8, where line 151a represents the working gap vs. temperature relationship after the edges of the bimetal strip have contacted the spring stop.

The invention is not to be restricted to the specific structural details or arrangement of parts herein set forth, as various modifications thereof may be effected without departing from the spirit and scope of this invention.

We claim as our invention:

1. An angular rate gyroscope including: a fluid-tight gyro rotor support; a fluid-tight frame therefor; first means supported by said frame and having a generally cylindrical inner surface, the radius of which inner surface decreases with increase in temperature; a dielectric fluid medium pervading the interior of said frame including the space between said first means and said rotor support, the viscosity of which fluid medium decreases with increase in temperature, the variation with respect to temperature of said viscosity and of said space between said first means and said rotor support being such that the coefficient of damping of said fluid medium remains relatively constant over at least the temperature range from 30° F. to 150° F., said coefficient of damping being defined by the relationship $$C_d = \mu \frac{2\pi R^3 L}{h}$$

where R and L are respectively the outer radius and the length of said rotor support, $\mu$ is said viscosity and $h$ is said gap between said inner surface of said first means and said outer surface of said rotor support.

2. An angular rate gyroscope including: a fluid-tight gyro rotor support having a right cylindrical outer surface; a fluid-tight frame therefor; a composite insert supported by said frame and having a generally cylindrical inner surface, the radius of which decreases with increase in temperature; a dielectric fluid medium pervading the interior of said frame including the space between said insert and said rotor support, the viscosity of which decreases with increase in temperature, the variation with respect to temperature of said viscosity and of said space between said composite insert and said rotor support being such that the coefficient of damping of said fluid medium remains relatively constant over at least the temperature range from 30° F. to 150° F., said coefficient of damping being defined by the relationship $$C_d = \mu \frac{2\pi R^3 L}{h}$$

where R and L are respectively the outer radius and the length of said rotor support, $\mu$ is said viscosity and $h$ is said gap between said inner surface of said composite insert and said outer surface of said rotor support.

3. An angular rate gyroscope including: a fluid-tight gyro rotor support having a right cylindrical outer surface; a fluid-tight frame therefor; a composite insert supported by said frame and having a generally cylindrical inner surface, the radius of said inner surface being adapted to decrease with increase in temperature; a dielectric fluid medium pervading the interior of said frame including the space between said insert and said rotor support, the viscosity of said fluid medium decreasing with increase in temperature, the variation with respect to temperature of said viscosity and of said space between said composite insert and said rotor support being such that the coefficient of damping of said fluid medium remains relatively constant over at least the temperature range from 30° F. to 150° F., said coefficient of damping being defined by the relationship $$C_d = \mu \frac{2\pi R^3 L}{h}$$

where R and L are respectively the outer radius and the length of said rotor support, $\mu$ is said viscosity and $h$ is said gap between said inner surface of said composite insert and said outer surface of said rotor support, said composite insert being formed of vinyl butyral acetate.

4. An angular rate gyroscope including: a fluid-tight gyro rotor support; a fluid tight frame therefor; first means supported by said frame and having a generally cylindrical inner surface, the radius of which decreases with increase in temperature; a dielectric fluid medium pervading the interior of said frame including the space between said inner surface and said rotor support, the viscosity of which decreases with increase in temperature, the variation with respect to temperature of said viscosity and of said space between said first means and said rotor support being such that the coefficient of damping of said fluid medium remains relatively constant over a predetermined temperature range, said coefficient of damping being defined by the relationship $$C_d = \mu \frac{2\pi R^3 L}{h}$$

where R and L are respectively the outer radius and the length of said rotor support, $\mu$ is said viscosity and $h$ is said gap between said inner surface of said first means and said outer surface of said rotor support.

5. A measuring and indicating device comprising: a central member having a generally right cylindrical outer surface, the angular movement of said central member about a longitudinal axis thereof being indicative of the quantity being measured, electrical pickoff means associated with said central member adapted to produce an electrical signal indicative of said angular movement; temperature-responsive housing means for said central member having a generally right circular cylindrical inner surface of slightly greater diameter than the outer surface of said central member, said housing means being adapted to reduce the radius of said inner surface thereof with increase in temperature thereof; dielectric fluid means, the viscosity of which decreases with increase in temperature, pervading the gap between said inner and outer surfaces, said viscosity and said gap varying with temperature in a ratio such that the frictional resistance of said fluid means to angular oscillation of said central member remains relatively constant; said housing means being adapted to receive forces normal to said longitudinal axis imparted to said housing means by said central member through said fluid means.

6. A measuring and indicating device comprising a central member having a generally right cylindrical outer surface, the angular movement of said central member about a longitudinal axis thereof being indicative of the quantity being measured, electrical pickoff means associated with said central member adapted to produce an electrical signal indicative of said angular movement; temperature-responsive housing means for said central member including a bimetal ring having a generally cylindrical inner surface and a longitudinal slot such that the radius thereof decreases with increase in temperature thereof, the edges of said slot moving closer together with increase in temperature, dielectric fluid means pervading the gap between said inner and outer surfaces, said viscosity and said gap varying with temperature in a ratio such that the frictional resistance of said fluid means to angular oscillation of said central member remains relatively constant over a predetermined temperature range; said housing means being adapted to receive forces normal to said longitudinal axis imparted to said housing means by said central member through said fluid means.

7. In an angular rate gyro including a fluid-tight rotor support, a fluid-tight frame thereabout, and crossed planar spring means each secured at one end to said rotor support and at the other end to said frame adapted to yieldingly oppose precession of said support about an axis at an angle to the gyro spin axis; dielectric fluid means pervading the interior of said frame exterior to said support; and temperature responsive rotor support housing means supporting and at least partially enclosing said rotor support operative in combination with said fluid means as a bearing for rotation of said support about said axis at an angle to said gyro spin axis, said housing having an inner surface the cross-sectional area of which is an inverse function of temperature such that the frictional resistance to rotation of said rotor support presented by said fluid means in the gap between said rotor support and said housing remains relatively constant with variation of temperature.

8. In an angular rate gyro including a fluid-tight rotor support, a fluid-tight frame thereabout, and crossed planar spring means each secured at one end to said rotor support and at the other end to said frame adapted to yieldingly oppose precession of said support about an axis at an angle to the gyro spin axis; dielectric fluid means pervading the interior of said frame exterior to said support; and temperature responsive rotor support housing means supporting and substantially enclosing said rotor support operative in combination with said fluid means as a bearing for rotation of said support about said axis at an angle to said gyro spin axis, said rotor support means having an inner surface the cross-sectional area of which is an inverse function of temperature such that the frictional resistance to rotation of said rotor support presented by said fluid means in the gap between said rotor support and said housing remains constant within 10% over the range from 30° F. to 150° F. with variation of temperature.

9. In an angular rate gyro including a fluid-tight rotor support, a fluid-tight frame thereabout, and crossed planar spring means each secured at one end to said rotor support and at the other end to said frame adapted to yieldingly oppose precession of said support about an axis at an angle to the gyro spin axis; dielectric fluid means pervading the interior of said frame exterior to said support; rotor support housing means including a plurality of segments supported by said frame and defining a generally cylindrical inner surface, said segments being formed of material expansible with increase in temperature such that the radius of said inner surface decreases with increase in temperature, said rotor support housing means having an inner surface the cross-sectional area of which is an inverse function of temperature such that the frictional resistance to rotation of said rotor support presented by said fluid means in the gap between said rotor support and said housing remains relatively constant with variation of temperature.

10. In an angular rate gyro including a fluid-tight cylindrical rotor support, a fluid-tight frame thereabout, and crossed planar spring means each secured at one end to said rotor support and at the other end to said frame adapted to yieldingly oppose precession of said support about an axis at an angle to the gyro spin axis; dielectric fluid means pervading the interior of said frame exterior to said support; bearing support housing means including a plurality of segments supported by said frame and defining a generally cylindrical inner surface, said segments being formed of material expansible with increase in temperature such that the radius of said inner surface decreases with increase in temperature, said segments being formed of vinyl butyral acetate, the cylindrical inner surface defined by said segments being adapted to receive said cylindrical rotor support, said housing means having an inner surface the cross-sectional area of which is an inverse function of temperature such that the frictional resistance to rotation of said rotor support presented by said fluid means in the gap between said rotor support and said housing remains relatively constant with variation of temperature.

11. In an angular rate gyro including a fluid-tight rotor support, a fluid-tight frame thereabout, and crossed planar spring means each secured at one end to said rotor support and at the other end to said frame adapted to yieldingly oppose precession of said support about an axis at an angle to the gyro spin axis; dielectric fluid means pervading the interior of said frame exterior to said support; composite bimetal housing means having a generally cylindrical inner surface, longitudinally slotted so that increase in temperature will effect unequal expansion of the sections thereof to decrease the radius of said inner surface, said housing means having an inner surface the cross-sectional area of which is an inverse function of temperature such that the frictional resistance to rotation of said rotor support presented by said fluid means in the gap between said rotor support and said housing remains relatively constant with variation of temperature.

12. In an angular rate gyro including a fluid-tight rotor support, a fluid-tight frame thereabout, and crossed planar spring means each secured at one end to said rotor support and at the other end to said frame adapted to yieldingly oppose precession of said support about an axis at an angle to the gyro spin axis; dielectric fluid means pervading the interior of said frame exterior to said support; fluid-tight rotor support housing means including temperature responsive means having a generally cylindrical inner surface of slightly greater radius than the radius of said rotor support, adapted to receive said rotor support therein, said inner radius of said temperature responsive means being an inverse function of temperature, said housing means having an inner surface the cross-sectional area of which is an inverse function of temperature such that the frictional resistance to rotation of said rotor support presented by said fluid means in the gap between said rotor support and said housing remains relatively constant with variation of temperature.

13. In an angular rate gyro including a fluid-tight rotor support, a fluid-tight frame thereabout, and crossed planar spring means each secured at one end to said rotor support and at the other end to said frame adapted to yieldingly oppose precession of said support about an axis at an angle to the gyro spin axis; dielectric fluid means pervading the interior of said frame exterior to said support; composite bimetal housing means having a generally cylindrical inner surface, longitudinally slotted so that increase in temperature will effect unequal expansion of the sections thereof to decrease the radius of said inner surface, stop means within said longitudinal slot for limiting the reduction in radius of said inner surface to a predetermined radius; said housing means thereby having an inner surface the cross-sectional area of which is an inverse function of temperature such that the frictional resistance to rotation of said rotor support presented by said fluid means in the gap between said rotor support and said housing remains relatively constant, with variation of temperature.

References Cited in the file of this patent

UNITED STATES PATENTS

| | | |
|---|---|---|
| 1,407,320 | Bouche | Feb. 21, 1922 |
| 2,013,109 | Reynolds | Sept. 3, 1935 |
| 2,687,648 | Konet | Aug. 31, 1954 |
| 2,690,014 | Draper et al. | Sept. 28, 1954 |
| 2,699,846 | Pitman et al. | Jan. 18, 1955 |
| 2,718,149 | Bamford et al. | Sept. 20, 1955 |